United States Patent
Con et al.

(10) Patent No.: US 12,306,000 B2
(45) Date of Patent: *May 20, 2025

(54) VEHICLE CONTROL SYSTEM

(71) Applicant: Transportation IP Holdings, LLC, Norwalk, CT (US)

(72) Inventors: Eren Con, Chicago, IL (US); Michael Patrick Smith, Chicago, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 298 days.

This patent is subject to a terminal disclaimer.

(21) Appl. No.: 17/864,567

(22) Filed: Jul. 14, 2022

(65) Prior Publication Data

US 2022/0349722 A1 Nov. 3, 2022

Related U.S. Application Data

(63) Continuation-in-part of application No. 17/002,520, filed on Aug. 25, 2020, now Pat. No. 11,402,226, which is a continuation of application No. 15/923,461, filed on Mar. 16, 2018, now Pat. No. 11,002,556.

(Continued)

(51) Int. Cl.
*G01C 21/34* (2006.01)
*G05D 1/00* (2006.01)
*G08G 1/00* (2006.01)

(52) U.S. Cl.
CPC ....... *G01C 21/3469* (2013.01); *G05D 1/0223* (2013.01); *G05D 1/0291* (2013.01); *G08G 1/22* (2013.01)

(58) Field of Classification Search
CPC ............. G01C 21/3469; G05D 1/0223; G05D 1/0291; G08G 1/22; G08G 1/0112; G08G 1/0129; G08G 1/096716; G08G 1/096725; G08G 1/096775; G08G 1/096816; G08G 1/096844; G08G 1/202
See application file for complete search history.

(56) References Cited

U.S. PATENT DOCUMENTS 5,680,122 A   10/1997   Mio et al.
5,913,917 A   6/1999   Murphy
(Continued)

FOREIGN PATENT DOCUMENTS

WO   2013108246 A1   7/2013

OTHER PUBLICATIONS

JP H07105165 A with English translation. Date filed Sep. 30, 1993. Date published Apr. 21, 1995. (Year: 1995).*

(Continued)

*Primary Examiner* — Calvin Cheung
(74) *Attorney, Agent, or Firm* — K&L Gates LLP

(57) ABSTRACT

A system includes one or more processors that may determine one or more of an energy drag or a parasitic energy loss for upcoming planned travel of a vehicle along one or more routes based on externality information. The one or more processors may determine the one or more of the energy drag or the parasitic energy loss for each of plural, different route locations along the one or more routes and may change one or more aspects of the upcoming planned travel of the vehicle based on the one or more of energy drag or parasitic energy loss that is determined.

18 Claims, 4 Drawing Sheets

Related U.S. Application Data

(60) Provisional application No. 62/478,368, filed on Mar. 29, 2017.

(56) References Cited

U.S. PATENT DOCUMENTS

| | | | |
|---|---|---|---|
| 6,032,097 | A | 2/2000 | Iihoshi et al. |
| 6,128,559 | A | 10/2000 | Saitou et al. |
| 6,311,265 | B1* | 10/2001 | Beckerle ............. G06F 8/314 |
| | | | 712/203 |
| 6,813,561 | B2 | 11/2004 | MacNeille et al. |
| 8,352,111 | B2 | 1/2013 | Mudalige |
| 8,706,409 | B2 | 4/2014 | Mason et al. |
| 9,002,547 | B2 | 4/2015 | Matthews et al. |
| 9,182,764 | B1 | 11/2015 | Kolhouse |
| 9,261,374 | B2 | 2/2016 | Mundinger et al. |
| 9,441,980 | B2 | 9/2016 | Corne et al. |
| 9,605,606 | B2 | 3/2017 | Dufford et al. |
| 9,701,302 | B2 | 7/2017 | Matsunaga et al. |
| 9,766,153 | B2 | 9/2017 | Magee |
| 9,784,590 | B2* | 10/2017 | Englehardt ........ G01C 21/3469 |
| 9,792,736 | B1* | 10/2017 | Koebler ................ G07C 5/008 |
| 9,834,111 | B2* | 12/2017 | Grewal ................ B60W 40/12 |
| 9,950,751 | B2* | 4/2018 | Heil ..................... B62D 37/02 |
| 9,956,965 | B1* | 5/2018 | Hall ..................... B60W 10/22 |
| 10,017,179 | B2* | 7/2018 | Alden .................. B60W 30/16 |
| 10,124,806 | B2* | 11/2018 | Raffone .............. G01G 19/086 |
| 10,570,819 | B1 | 2/2020 | Bear |
| 10,908,617 | B2* | 2/2021 | Kodera ................ B60W 10/20 |
| 11,002,556 | B2 | 5/2021 | Smith et al. |
| 11,402,226 | B2 | 8/2022 | Smith et al. |
| 2003/0089167 | A1 | 5/2003 | Markstaller et al. |
| 2006/0237237 | A1 | 10/2006 | Kerschbaum |
| 2007/0219682 | A1 | 9/2007 | Kumar et al. |
| 2008/0033605 | A1 | 2/2008 | Daum et al. |
| 2008/0249667 | A1 | 10/2008 | Horvitz et al. |
| 2010/0023190 | A1 | 1/2010 | Kumar et al. |
| 2010/0262321 | A1 | 10/2010 | Daum et al. |
| 2011/0040480 | A1 | 2/2011 | Tebbutt |
| 2011/0307118 | A1 | 12/2011 | Bryant |
| 2012/0221257 | A1 | 8/2012 | Froncioni et al. |
| 2012/0239268 | A1 | 9/2012 | Chen et al. |
| 2013/0013195 | A1 | 1/2013 | Kritt et al. |
| 2013/0013451 | A1 | 1/2013 | Kritt et al. |
| 2013/0099525 | A1 | 4/2013 | Keyes |
| 2013/0261914 | A1 | 10/2013 | Ingram et al. |
| 2014/0052373 | A1 | 2/2014 | Hoch et al. |
| 2014/0309806 | A1* | 10/2014 | Ricci ..................... H04W 48/04 |
| | | | 701/1 |
| 2014/0350767 | A1 | 11/2014 | Fries |
| 2015/0019132 | A1 | 1/2015 | Gusikhin et al. |
| 2015/0020586 | A1 | 1/2015 | Kerestan |
| 2015/0279218 | A1* | 10/2015 | Irrgang ............... G07C 5/0816 |
| | | | 701/3 |
| 2017/0011633 | A1 | 1/2017 | Boegel |
| 2017/0030728 | A1 | 2/2017 | Baglino et al. |
| 2017/0293296 | A1* | 10/2017 | Stenneth ........ G06Q 10/06315 |
| 2018/0037117 | A1 | 2/2018 | Koebler |
| 2018/0079405 | A1 | 3/2018 | Gaither et al. |
| 2018/0170396 | A1 | 6/2018 | Burnette |
| 2018/0341729 | A1 | 11/2018 | Kowalyshyn |

OTHER PUBLICATIONS

WO 9612187 A1 (text version only). Date filed Feb. 2, 1995. Date published Feb. 25, 1996. (Year: 1996).*

JP 2009133779 A with English translation. Date filed Nov. 30, 2007. Date published Jun. 18, 2009. (Year: 2009).*

Baker, "The Simulation of Unsteady Aerodynamic Cross Wind Forces on Trains." Journal of Wind Engineering and Industrial Aerodynamics, vol. 98 No. 2, 2010, pp. 88-99 Publisher, Country (12 pages).

Douglas et al., "An Assessment of Available Measures to Reduce Traction Energy Use in Railway Networks." Energy Conversion and Management, 2015, pp. 1149-1165, 106, Publisher, Country (17 pages).

Osth, et al., "A Study of the Aerodynamics of a Generic Container Freight Wagon Using Large-Eddy Simulation." Journal of Fluids and Structures, 2014, vol. 44, pp. 31-51, Publisher, Country (21 pages).

Alam et al., "Effects of Crosswinds on Double Stacked Container Wagons", 16th Australasian Fluid Mechanics Conference, Australia, Dec. 2-7, 2007, (4 pages).

Barkan, "Railroad Transportation Energy Efficiency", Illinois Railroad Engineering Program, 2007, Yuhas (61 pages}.

Beagles et al., "The Aerodynamics of Freight: Approaches to Save Fuel by Optimising the Utilisation of Container Trains", Proceedings of the Institution of Mechanical Engineers, Part F: Journal of Rail and Rapid Transit 2017 (38 pages).

Burmeister, "GIS Wind Force Analytics", Dipl.-Wirtsch.-Ing. University, Fraunhofer CML (14 pages).

Federal Railroad Administration, "Comparative Evaluation of Rail and Truck Fuel Efficiency on Competitive Corridors", Final Report, Nov. 19, 2009, ICF International (156 pages).

Paul et al., "Application of CFO to Rail Car and Locomotive Aerodynamics", The Aerodynamics of Heavy Vehicles II: Trucks, Buses, and Trains. Springer, Berlin, Heidelberg, 2009, 259-297, (39 pages).

Website: Sailing News, "America's Cup: Apparent wind", https://www.youtube.com/watch?v=VAmUcRdqhjU&feature=youtu.be&t=44s Video, 2:31, Youtube, Sep. 25, 2013, (2 pages).

Storms et al., "Fuel Savings & Aerodynamic Drag Reduction From Rail Car Covers", AfricaRail 2008; Jun. 2-6, 2008; Johannesburg; South Africa, (2 pages).

Yeung-Cheng et al., "Options for Improving the Energy Efficiency of Intermodal Freight Trains", Transportation Research Record: Journal of the Transportation Research Board, No. 1916, Transportation Research Board of the National Academies, Washington, D.C., 2005, pp. 47-55. (9 pages).

* cited by examiner

VEHICLE CONTROL SYSTEM

CROSS-REFERENCE TO RELATED APPLICATIONS

This application is a continuation-in-part of U.S. patent application Ser. No. 17/002,520 (filed 25 Aug. 2020), which is a continuation of U.S. patent application Ser. No. 15/923,461 (filed 16 Mar. 2018, now U.S. Pat. No. 11,002,556), which claims priority to U.S. Provisional Application No. 62/478,368, filed on 29 Mar. 2017. The entire disclosures of these applications are incorporated herein by reference.

FIELD

The subject matter described herein relates to transportation systems.

BACKGROUND

Operators using transportation systems seek solutions to moving vehicles through the transportation systems that address fuel costs, labor shortages, labor hours-of-service constraints, and safety. Some solutions involve platooning several vehicles to travel together along routes between locations. Existing solutions for coordination of a plurality of vehicles in a platoon or train provide for incremental process performance per one or more performance criteria. The coordination of a plurality of vehicles in a platoon or train can reduce the total wind drag forces and associated parasitic energy losses of the group of vehicles (relative to the vehicles traveling alone).

But current systems do not provide insight into other factors that can impact the decisions of which vehicles to include in a platoon, when the platoon of vehicles should travel, and/or how the platoon of vehicles should travel to increase the efficiency of the vehicles relative to traveling outside of the platoon, traveling at other times, and/or traveling in another manner (e.g., taking other routes). Thus, operators may direct a platoon of vehicles to travel to a destination location in a manner that is less efficient.

BRIEF DESCRIPTION

In one embodiment, a method may include receiving or otherwise determining wind information for an upcoming trip along one or more routes with one or more processors, determining one or more of respective wind drags or respective parasitic energy losses for travel by different groups of vehicles in the upcoming trip based on the wind information with the one or more processors (where each of the groups of vehicles has at least two respective vehicles), and one or more of visually presenting the one or more of wind drags or parasitic energy losses for the different groups of vehicles, or automatically selecting a group of the different groups of vehicles for travel along the one or more routes in the trip based on the one or more of wind drags or parasitic energy losses that are determined with the one or more processors.

The method also may include receiving a user-selected group of the different groups of vehicles for travel along the one or more routes in the trip with the one or more processors responsive to the one or more of wind drags or parasitic energy losses for the different groups of vehicles that are visually presented and automatically generating one or more control signals for controlling the vehicles of the user-selected group for travel along the one or more routes in the trip with the one or more processors. The method also may include automatically generating one or more control signals with the one or more processors for controlling the vehicles of the group of the different groups of vehicles that was automatically selected, for travel along the one or more routes in the trip.

In one embodiment, a system is provided that includes one or more processors that may determine one or more of an energy drag or a parasitic energy loss for upcoming planned travel of a vehicle along one or more routes based on externality information. The one or more processors may determine the one or more of the energy drag or the parasitic energy loss for each of plural, different route locations along the one or more routes and may change one or more aspects of the upcoming planned travel of the vehicle based on the one or more of energy drag or parasitic energy loss that is determined.

In another example, a method is provided that may include determining one or more of an energy drag or a parasitic energy loss for upcoming planned travel of a vehicle along one or more routes based on externality information, determining the one or more of the energy drag or the parasitic energy loss for each of plural, different route locations along the one or more routes, and changing one or more aspects of the upcoming planned travel of the vehicle based on the one or more of energy drag or parasitic energy loss that is determined.

Another system may include one or more processors that may determine wind speed and wind direction for plural locations along one or more routes using an artificial intelligence or machine learning model, the one or more processors also configured to determine one or more of wind drag or a parasitic energy loss for travel by a vehicle along the one or more routes based on the wind speed and wind direction. The one or more processors may determine settings of the vehicle for travel along the one or more routes based on the one or more of wind drag or parasitic energy loss that is determined using the artificial intelligence or machine learning model.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
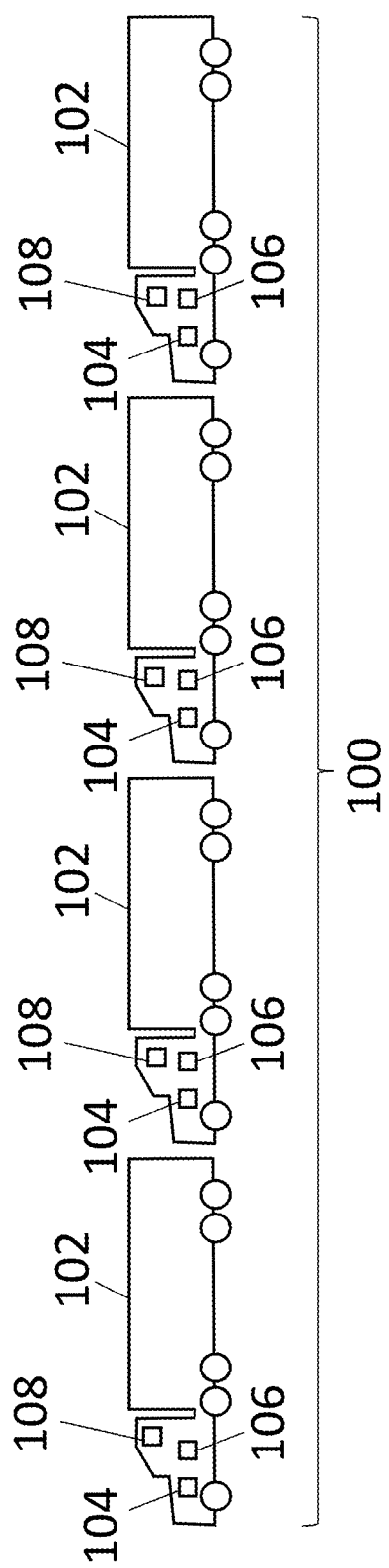
FIG. 1 illustrates one example of a group of vehicles.

One or more embodiments of the inventive subject matter described herein provide vehicle control systems and methods for controlling a transportation process having one or more vehicles. The systems and methods provide improved process performance per one or more performance criteria.

These criteria can include energy efficiency (e.g., fuel efficiency and/or electric energy efficiency), equipment life expectancy, safety, emissions, operational costs, labor productivity, or the like. The systems and methods can provide diagnostic information and/or prognostic information for improving operation of transportation systems over a time horizon via decision support. This information can be used by the control system (or another control system) to control operation of one or more vehicles (such as movement, maintenance, repair, selection for a trip, etc.).

This diagnostic information and/or prognostic information can include information about energy impacts that can impact operation of the vehicles. These energy impacts can include energy losses (e.g., due to parasitic energy drains or loads) and/or energy drags (e.g., energy losses caused by external factors). Examples of energy drags can include wind drag forces exerted on one or more groups of vehicles traveling along routes in a transportation network, friction forces exerted on the vehicles, etc. The energy losses can include parasitic energy losses of the group(s) of vehicles in a platoon (e.g., energy consumed by loads that do not operate to propel or otherwise operate components of the vehicle). The vehicles can be automobiles, trucks, rail vehicles, marine vessels, aircraft, mining vehicles, other off-highway vehicles (e.g., vehicles that are not designed or are not legally permitted for travel on public roadways), aircraft (e.g., unmanned or manned aerial vehicles), or the like, traveling together in a group (also referred to as a platoon, convoy, or train). The vehicles may not be mechanically coupled with each other in a platoon or convoy. For example, multiple trucks can communicate with each other during movement to coordinate the relative movements of the trucks so that the trucks travel together along the routes as a group. Optionally, the vehicles can be mechanically coupled with each other, such as in a train of rail vehicles.

The energy drag forces and/or other parasitic energy losses can be determined based on a variety of factors. These factors can include vehicle and/or group characteristics and/or externality information. The vehicle and/or group characteristics can include the moving speed of the vehicle or vehicle group, the direction of movement of the vehicle or vehicle group, the geographic location of the vehicle or vehicle group, a coefficient of wind drag, the coefficient of wind drag as a function of apparent wind yaw angle, the friction generated by components of the vehicle (e.g., gears), the size of the vehicle or vehicle group (e.g., whether the vehicle or vehicle group has a large surface area that contacts the wind and either increases wind drag or can be used to generate force as a sail due to a tailwind), etc. These vehicle and/or group characteristics can be previous characteristics of the vehicle or vehicle group, current characteristics of the vehicle or vehicle group, and/or upcoming (e.g., predicted or planned) characteristics of the vehicle or vehicle group. The externality information can include the wind speed (e.g., the ground level true wind speed and/or apparent wind speed), the wind direction, the consistency in the wind (e.g., whether the wind is primarily blowing in a single direction or swirling in multiple directions), etc. The true wind speed may include a wind speed measured by a stationary observer (e.g., a sensor), while the apparent wind speed may include a wind speed measured by a moving observer (e.g., a sensor that is moving relative to the ground). The externality information optionally can include a combination or both the ground level true wind direction and the apparent wind direction. The wind information can be the previous, current, and/or upcoming (e.g., predicted or planned) wind speed and/or direction.

The diagnostic information and/or prognostic information about the energy drag forces and associated parasitic energy losses can be synthesized to provide decision support to improve scope and target allocation of solutions for coordination of a plurality of vehicles in a vehicle group (e.g., convoy, platoon, swarm, or train) by geographical location (e.g., as a function of location such that the energy drags and/or losses are different for different locations). Effective decision support for the dynamic geographical allocation of solutions for coordination of a plurality of vehicles in a platoon or train for improved total factor productivity is provided by the systems and methods described herein.

Examples of inputs into the systems and methods for use in determining the diagnostic information and/or prognostic information about the energy drag forces and associated parasitic energy losses can include the ground level true wind speed and direction, the locations or layouts of routes traveled by the groups of vehicles, the coefficients of drag for the vehicles or groups of vehicles as a function of apparent wind yaw angle, and/or the moving speed of the vehicles or groups of vehicles.

The energy drags and/or associated parasitic energy losses for previous trips, current trips, and/or upcoming (e.g., planned) trips of a variety of different combinations of vehicle groups can be determined and reported to operators or users of the systems and methods. Based on this information, the operators or users can determine which vehicles to include in a group of vehicles for a trip, how many vehicles to include in the group of vehicles for the trip, when the group of vehicles should depart or otherwise travel in the trip, and/or how the group of vehicles should travel in the group (e.g., the operational settings, routes, or the like, that the vehicles in the group should move according to or on during the trip). Optionally, the vehicles (e.g., controllers or control systems disposed onboard the vehicles) can automatically change how the vehicles operate based on the energy drag forces and/or the parasitic energy losses. For example, the controllers or control systems can automatically slow down movement of the vehicles in areas having greater headwinds to reduce wind drag and/or parasitic energy losses. As another example, the controllers or control systems can automatically speed up movement of the vehicles in areas having greater tailwinds to take advantage of the additional force provided by the winds. At least one technical effect of the inventive subject matter described herein includes the planning of a trip and/or automated control of vehicles during a trip in a more efficient manner based on the energy drag and associated parasitic energy loss (relative to not taking energy drag and parasitic energy loss into account).

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

FIG. 1 illustrates one example of a group 100 of vehicles 102. The group of vehicles optionally can be referred to as a vehicle system. The vehicles are shown as trucks, but optionally can be another type of vehicle, such as automobiles, other types of trucks, rail vehicles, marine vessels, aircraft, mining vehicles, other off-highway vehicles, or the like. The vehicles can consume fuel and/or electric energy to propel the vehicles (and the group) along one or more routes, pathways, paths, etc. As described above, the vehicles can be mechanically separate from each other or mechanically coupled with each other to travel along one or more routes in the group. The group optionally can be referred to as a platoon or train of the vehicles. Although four vehicles are in the group in the illustrated example, optionally, a different number of two or more vehicles can be in the group. In one embodiment, a group can include only a single vehicle.

One embodiment of a control system described herein can include controllers 104 and communication systems 106 onboard the vehicles. The communication systems may communicate with each other to coordinate relative movements of the vehicles. The controllers may represent hardware circuitry that includes and/or is connected with one or more processors (e.g., one or more microprocessors, field programmable gate arrays, and/or integrated circuits) that control movement of the vehicles. The controller of a vehicle can receive input from an onboard operator of the vehicle, from a controller onboard another vehicle in the same group or another group, and/or from a remote control device (e.g., a device or system that is off-board the vehicle or the vehicle group). This input can dictate a speed, throttle setting, brake setting, steering direction (e.g., heading), or the like, for the controller to implement via communication of one or more control signals to propulsion and/or braking equipment of the vehicle. The communication systems can represent transceiving circuitry, such as modems, antennas, or the like, that communicate signals between the vehicles and/or with other systems. The controllers and communication systems can communicate with each other to allow for the vehicles to coordinate the movements of the vehicles with each other to cause the group of vehicles to travel along the routes, such as by maintaining a separation distance between the vehicles and/or not allowing the separation distance between the vehicles to become too large.

The vehicles may include onboard sensors 108 that operate to determine locations, headings, and/or speeds of the vehicles. The onboard sensors can represent global navigation satellite system (GNSS) receivers, such as global positioning system (GPS) receivers, wireless triangulation systems, dead reckoning systems, inertial measurement devices (e.g., accelerometers), or the like. The onboard sensors can determine locations, headings, speeds, and the like, of the vehicles for use in determining the energy drags, determining the parasitic energy losses, and/or controlling movement of the vehicles, as described herein. For example, the onboard sensors can be used to collect and/or verify externality data on the energy drags and/or parasitic energy losses experienced or measured at the different locations. This information can be used to select vehicles for inclusion in another group of vehicles (as described herein). Optionally, the onboard sensors can determine where the vehicles are located to assist vehicle controllers (described herein) to determine how to control or change movement of the vehicles based on the measured, predicted, and/or expected energy drags and/or parasitic energy losses that are determined as described herein. In one embodiment, without determining the locations of the vehicles using the onboard sensors, the control system and/or controllers described herein may be unable to determine which vehicles to include in a vehicle group and/or how to control movement of the vehicles based on the energy drags and/or parasitic energy losses.

Transportation system operators manage movement of cargo, people, or the like, across geographic areas by determining trips that different groups of vehicles are to take. These trips can be determined by configuring how many vehicles to include in a group, which vehicles to include in a group (out of a larger fleet of vehicles), which routes the group of vehicles are to travel on to reach an intermediate or destination of the trip, and/or when the group of vehicles is to travel on the trip. A wide variety of factors can impact the decision of the operator to configure the trips of the groups of vehicles. One embodiment of the inventive subject matter described herein provides a multi-objective control system and method for assisting the operators or other systems in optimizing or configuring the groups of vehicles for the trips and/or for automatically optimizing or configuring the groups of the vehicles for the trips. The term "optimization" and various forms thereof are not limited to the best possible, most effective, or most efficient configuration of the groups of vehicles, but include improving the effectiveness and/or efficiency in which the vehicles are moved through a transportation network of routes relative to a non-optimized control system or method. This improvement can be achieved by configuring the trips of the groups of vehicles based on energy drag and parasitic energy losses on the potential groups of vehicles relative to configuring the groups of vehicles without consideration to the energy drag and parasitic energy losses.

Figure 2:
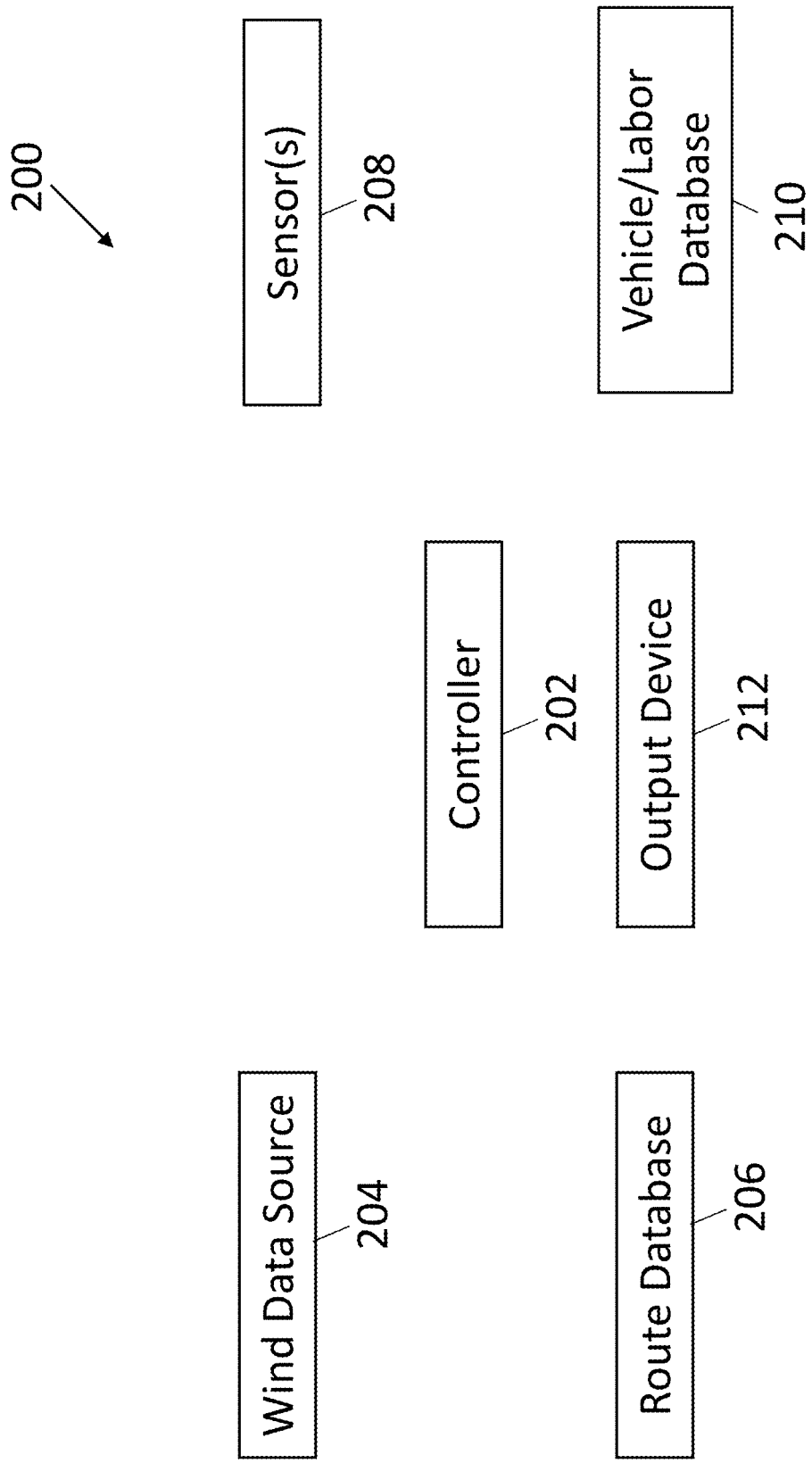
FIG. 2 illustrates one example of a multi-objective control system.

FIG. 2 illustrates one example of a multi-objective control system 200. The control system includes an analysis controller 202 that obtains information from a variety of sources to determine how to configure trips and/or groups of vehicles (shown in FIG. 1) for the trips based on wind drag and parasitic energy loss determinations, or to assist the determination of how to configure trips and/or groups of vehicles for the trips. The analysis controller shown in FIG. 2 may represent hardware circuitry that includes and/or is connected with one or more processors (e.g., one or more microprocessors, field programmable gate arrays, and/or integrated circuits) that make these determinations.

One source of information obtained by or provided to the analysis controller includes externality information (also referred to as externality data). This information can be provided by or obtained from a data source 204. The data source can be a central data repository of externality information, such as the United States National Weather Service. Optionally, the data source can represent wind speed sensors in different locations, friction measurements or default values (representing coefficients of friction between components of the vehicle, etc.). The information from the data source may indicate the ground level true wind speed and/or direction at different geographic locations. Optionally, the data provided by the data source can be a forecast of weather (e.g., wind) conditions. For example, the data source can communicate predicted, estimated, or expected wind speeds and/or directions at various locations as the data.

A route database 206 can be another source of information for the analysis controller. The route database can represent a computer readable memory, such as one or more computer hard drives, optical drives, flash drives, or the like. The route database may store information on the layout of routes over which the groups of vehicles can travel. This information can include geographic locations of the routes, curvatures of the routes, grades of the routes, traffic information (e.g., previous, current, or predicted amounts of traffic on the routes), or the like.

One or more sensors can be another source of information for the analysis controller. The sensors can represent one or more measuring devices that collect and report information to the analysis controller. In one embodiment, the sensors can be speed sensors (e.g., tachometers; GNSS receivers; wireless triangulation systems; dead reckoning systems; etc.) that measure/calculate and communicate moving speeds of the groups of vehicles. These speeds can be previous, current, or planned upcoming speeds of the groups of vehicles. In embodiments, sensor information (e.g., of vehicle speed, vehicle heading, and/or eternality information as sensed onboard a vehicle) is communicated wirelessly, using radiofrequency transceivers or the like, from vehicles to an offboard location having the one or more processors as described elsewhere herein. (Such radiofrequency transceivers may be additionally used for purposes other than communicating externality information, e.g., for voice or control communications.) In embodiments, one or more vehicles respectively include one or more on-board sensors that are configured to generate signals indicative of externality information as sensed on-board the vehicle(s). The signals may be generated when the vehicles are moving, and/or signals may be generated when the vehicles are not moving. For example, a system may include modes of operation where: a vehicle is purposefully controlled to a stop to determine wind information while the vehicle is stopped, using an on-board sensor; and/or wind information is generated from plural sensors on-board plural vehicles when the vehicles are stopped for purposes other than generating wind information, e.g., the vehicles may be parked, or may be temporarily stopped as part of normal operation along a route, for example, while at a station, or while waiting for a route to clear.

A vehicle and/or labor database 210 ("Vehicle/Labor Database" in FIG. 2) can be another source of information for the analysis controller. The vehicle and/or labor database can represent a computer readable memory, such as one or more computer hard drives, optical drives, flash drives, or the like. The vehicle and/or labor database stores information on which vehicles are available for a trip from one location to another, information on which personnel are available to drive or otherwise control the vehicles during the trip, information on how many personnel are available to drive or otherwise control the vehicles during the trip, information the availability of other resources for driving or otherwise controlling the vehicles during the trip (such as trailers for carrying cargo, the availability or unavailability of certain routes due to damage or repair, etc.).

The analysis controller can determine coefficients of energy drag for different vehicles and/or different combinations of the vehicles in one or more groups. These drag coefficients can represent factors by which energy or forces generated by the vehicle or group of vehicles for propulsion is lost. For example, greater drag coefficients indicate that larger amounts of tractive energy or forces are needed to keep the vehicle or vehicle group moving at a designated speed than for smaller drag coefficients. As one example, the drag coefficients can be determined as a function of apparent wind yaw angle. As another example, the drag coefficients can be determined as a coefficient of friction between two or more components of the vehicle or vehicle group (e.g., friction between gears, friction between wheels and a surface on which the vehicle or vehicle group is moving along, etc.). One example of a source for determining these energy drag coefficients includes the article A. Beagles and D. Fletcher, "The Aerodynamics Of Freight: Approaches To Save Fuel By Optimising The Utilisation Of Container Trains," Proceedings Of The Institution Of Mechanical Engineers, Part F: Journal Of Rail And Rapid Transit (2017).

The analysis controller can determine the drag forces exerted or expected to be exerted on different options of groups of vehicles based on the information provided to or otherwise obtained by the analysis controller. For example, the analysis controller can associate different wind speeds and/or directions with different segments of routes based on the information from the data source and the route database. The analysis controller can determine which routes could be traveled on by a group of vehicles to complete a trip based on information from the route database. For example, the analysis controller can determine available paths over the routes that could be traveled to reach a designated location (e.g., a destination location). In some networks of routes, multiple different combinations of routes or route segments may be traveled upon to travel from the same starting location to reach the same destination location. The analysis controller can identify different combinations of routes or route segments that could be traveled by the vehicle or vehicle group to travel from a first location to a second location based on the information in the route database or otherwise provided to or obtained by the analysis controller.

The analysis controller can receive or determine which vehicles are available to be included in one or more groups. For example, a list or other structure of which vehicles are available to be included in a group traveling from one location to another can be input to the analysis controller or obtained by the analysis controller (e.g., from the vehicle and/or labor database 210). The analysis controller can determine which vehicles are available for inclusion in the group from this information. For example, some vehicles may be in other locations, may be in need of repair, may not be suitable for the trip (e.g., cannot generate sufficient propulsion to complete the trip, are incapable of carrying passengers or certain cargos for the trip, cannot travel with other vehicles in the trip, or the like), and therefore not available to be included in the group.

The analysis controller can determine which or how much personnel is available to operate (e.g., drive) the vehicles in the group during the trip. This determination can be made based on the information stored in the vehicle and/or labor database. Some personnel may be in other locations, may not be trained or licensed to drive certain vehicles, or the like, and therefore unavailable for operating one or more vehicles in the group.

Some resources for driving the vehicles during the trip may be unavailable, such as refrigerated trailers for holding refrigerated cargo during the trip, trailers that are long enough to carry certain elongated cargo, etc. As another example, some roads, bridges, or tunnels may be unavailable for travel over or under during the trip due to damage to the road, bridge, or tunnel, ongoing repair or construction of the road, bridge, or tunnel, or the like.

The analysis controller determines potential groups of vehicles based on the availability of vehicles, the availability of labor (e.g., available personnel), and/or based on the route information for completing a trip. The analysis controller can then examine the impact of energy drag and parasitic energy losses on the different potential groups of vehicles. This examination can be performed by the analysis controller calculating the total energy drags exerted on each of the different potential groups of vehicles based on the potential routes over which the potential groups may travel to reach a destination location, the wind speeds and directions, the speeds at which the groups of vehicles may move, friction coefficients of the vehicles, etc. The wind speeds and directions can be previous, current, or predicted wind speeds and directions. The predicted wind speeds and directions can be based on previous and/or current wind speeds and directions, such as the wind speeds and directions that occurred on the same date, during the same season, or the like, in the same locations. Optionally, the predicted wind speeds and directions can be based on forecasted wind information. The moving speeds of the groups of vehicles can be the speed limits of the routes, can be a designated speed (e.g., twenty meters per second), or can be based on previous trips (such as the speeds of groups traveling the same routes and/or having the same number of vehicles during previous trips).

The parasitic energy losses of the different groups of vehicles may represent amounts of energy (e.g., fuel, electric energy, etc.) that may be consumed by energy drag during movement of the different groups of vehicles, energy that is generated for operating or propelling the vehicles but that is lost to other causes or loads (e.g., resistive losses, losses of energy or work due to friction, etc.). During movement of a vehicle or group of vehicles, fuel and/or electric energy is consumed to generate kinetic energy to the group of vehicles. The fuel can be used to generate mechanical energy, electric energy, and tractive energy. Some of the generated energy is lost to various parasitic losses, such as thermal losses, grade resistance, curve resistance, rolling resistance, and the like. One parasitic loss of this energy is wind drag. The analysis controller can calculate or estimate the amount of energy drag or the amount of energy lost to energy drag for the different potential groups of vehicles (e.g., based on physical modeling calculations using the wind information described herein). The energy drag and/or parasitic losses can then be used to determine which vehicles are to be included in a group of vehicles for a trip.

In one embodiment, the analysis controller visually presents the energy drag and/or parasitic losses to an operator of the control system via an output device 212. The output device can represent a display device, speaker, or the like. The analysis controller can visually present this information to allow the operator to use this information for deciding which vehicles to include in the group and/or which route(s) should be traveled by the vehicles for traveling from one location to another in the trip. Optionally, the analysis controller can use this information to automatically select a subset of vehicles from a larger set of vehicles, with the subset included in a vehicle group. The analysis controller can direct one or more external systems (e.g., robotic systems, cranes, etc.) to move the selected subset of vehicles into position in the vehicle group and/or to couple the vehicles in the selected subset together in the vehicle group.

The presentation generated by the analysis controller can include a list or set of options for which vehicles can be included in the group and/or the routes that can be traveled over for the trip, along with associated energy drags and/or parasitic energy losses. The list or set can be ranked or otherwise provided in an order reflective of the energy drags and/or parasitic losses, such as a list of the vehicles (or number of vehicles) to include in the group and/or routes to travel over for the trip in an order from the lowest energy drag and/or parasitic energy loss to the greatest energy drag and/or parasitic energy loss. The operator can then select the group of vehicles and/or routes based on this presentation. Optionally, the analysis controller can automatically select which vehicles are to be included in the group (as described below) without operator input. In one embodiment, the analysis controller can automatically adjust existing route plans for the trip based on the operator selection, energy drag, and/or parasitic energy loss that is or are determined. For example, the trip for the group may be scheduled to travel over a set of routes. The analysis controller can automatically change which routes are included in the set for the trip to reduce the energy drag and/or parasitic energy loss expected to be experienced during the trip (relative to including a different set or a prior planned set of routes).

In one embodiment, the analysis controller can communicate the energy drag and/or parasitic losses to one or more of the vehicle controllers. The vehicle controllers can use this information to automatically change movement of the vehicles based on the energy drags and/or parasitic energy losses. For example, a vehicle controller can examine the energy drag and/or parasitic energy loss associated with a stretch of a route and can automatically slow down movement of the vehicle (responsive to the energy drag indicating a strong force against the direction of travel of the vehicle, such as a headwind moving faster than a designated threshold speed, a friction coefficient that exceeds a designated threshold coefficient, etc.) or can automatically speed up movement of the vehicle (responsive to the energy drag indicating a tailwind in the direction of travel of the vehicle, indicating a headwind that is no faster than the designated threshold speed, indicating the friction coefficient does not exceed the designated threshold coefficient, etc.). Optionally, the vehicle controller can change which route a vehicle is traveling on based on the energy drag and/or parasitic energy losses. For example, in a self-driving vehicle, the vehicle controller can determine that another route is associated with less energy drag and/or less parasitic energy loss than a current or planned route. The analysis controller and/or vehicle controller can change which road the vehicle travels on to avoid the higher energy drag route.

Figure 3:
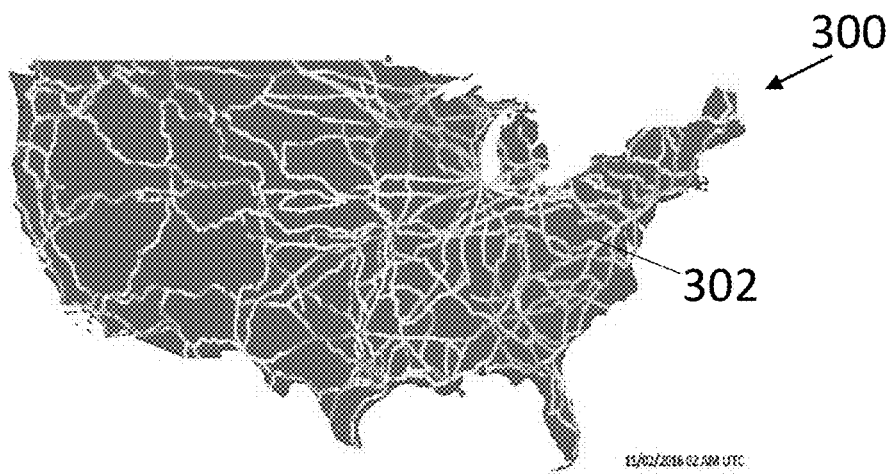
FIG. 3 illustrates one example of a visual presentation of energy drags and/or energy losses determined by the system shown in FIG. 2.
Figure 4:
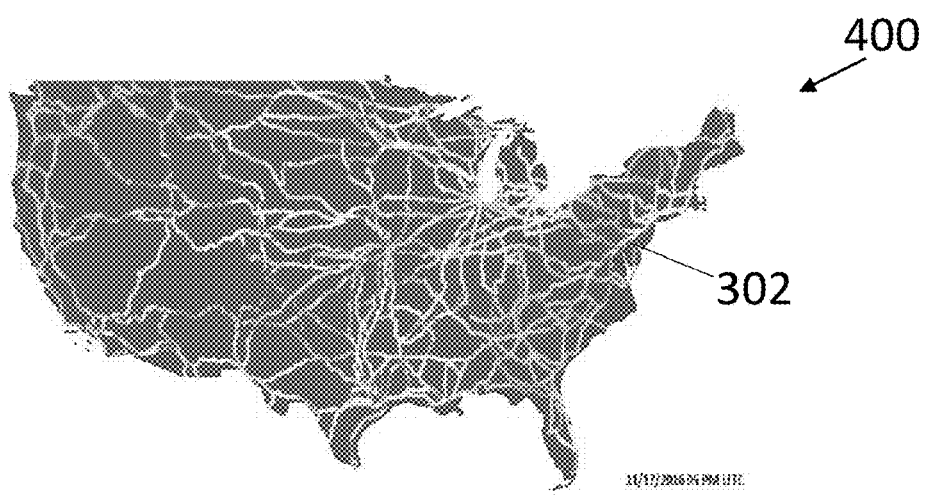
FIG. 4 illustrates another example of a visual presentation of energy drags and/or energy losses determined by the system shown in FIG. 2.
Figure 5:
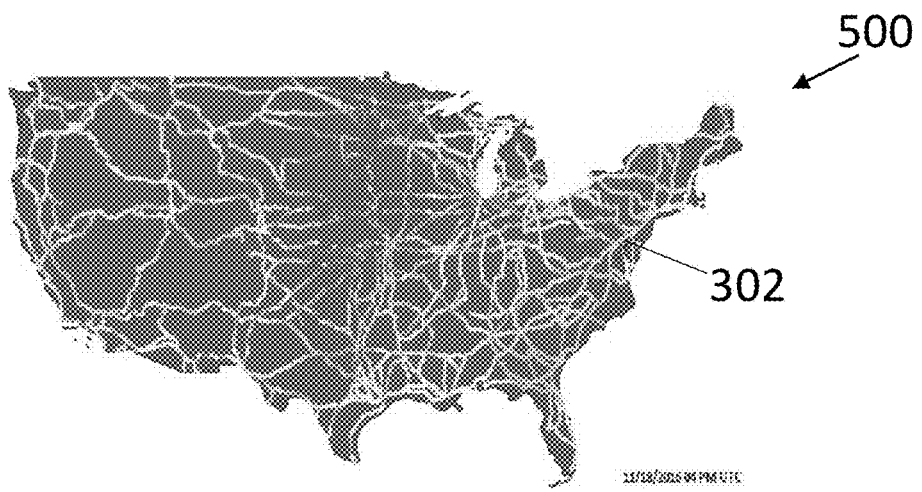
FIG. 5 illustrates another example of a visual presentation of energy drags and/or energy losses determined by the system shown in FIG. 2.

FIGS. 3 through 5 illustrate different examples of visual presentations 300, 400, 500 of energy drags and/or parasitic losses determined by the analysis controller. The visual presentations shown in FIGS. 3 through 5 may be maps of routes 302 forming at least part of a transportation network. The routes can be presented using different colors, lines, or the like, to represent different energy drags and/or parasitic energy losses for the potential group of vehicles. For example, for a first potential group of vehicles, the analysis controller can generate the map shown in FIG. 3 to indicate the energy drags and/or parasitic energy losses expected to be experienced by the first potential group of vehicles during travel on the various routes. The different colors, lines, etc., of the routes in the map shown in FIG. 3 can indicate greater or lesser energy drags and/or parasitic energy losses. The analysis controller can generate the map shown in FIG. 4 for a different, second potential group of vehicles to indicate the energy drags and/or parasitic energy losses expected to be experienced by the second potential group of vehicles during travel on the various routes. The maps shown in FIGS. 3 through 5 can be referred to as heat maps, with different levels of "heat" indicated by different colors that represent different amounts of energy drag and/or parasitic energy losses.

An operator of the control system can examine the maps to determine which group of vehicles to use for a trip. For example, if review of the maps indicates that the first potential group of vehicles associated with the map shown in FIG. 3 would experience less energy drag and/or lose less energy to parasitic energy losses than the second and third potential groups of vehicles (as represented by the corresponding maps shown in FIGS. 4 and 5), then the operator can select the first potential group of vehicles for the trip. The vehicles forming the first potential group can then be arranged together for actual travel in the trip.

Optionally, the analysis controller can make the determination of which group of vehicles should travel for the trip. The analysis controller can examine the energy drags and/or parasitic energy losses calculated for the trip for the different potential groups of vehicles. The analysis controller can then select a group from these potential groups based on the energy drags and/or parasitic energy losses. For example, the analysis controller can select the group having the smallest energy drag and/or parasitic energy losses from the potential groups. The analysis controller can then communicate a signal to the output device to notify the operator of the control system of which vehicles to include in the group. Optionally, the analysis controller can communicate a signal to the vehicle controllers of one or more of the vehicles to cause the vehicle controllers to automatically move the vehicles into position for forming the selected group. Optionally, the analysis controller can automatically change the trip to reduce the energy drag and/or parasitic energy loss. For example, the analysis controller can change which routes are being traveled over, the speeds at which the group of vehicles will travel, and/or when the group of vehicles travels to reduce the energy drag and/or parasitic energy loss (that otherwise would be experienced by traveling on another or previously planned set of routes).

Figure 6:
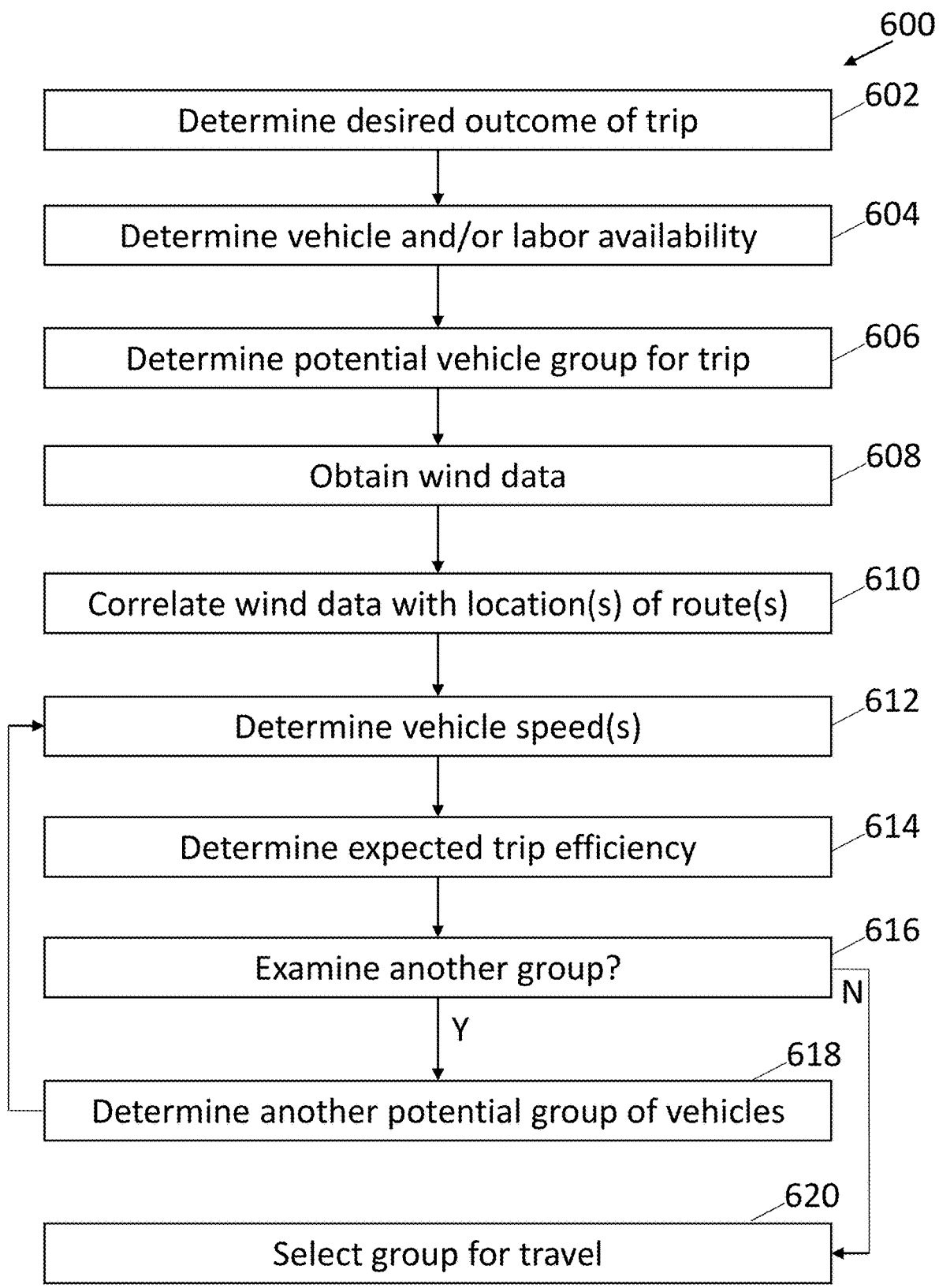
FIG. 6 illustrates a flowchart of a method for managing objectives in a transportation system.

FIG. 6 illustrates a flowchart of a method 600 for controlling objectives in a transportation system. The flowchart of the method can represent operations performed by the control system described above under the direction of software. Optionally, the software can be created or written based on an algorithm represented by the flowchart of the method.

At step 602, a desired outcome for a group of vehicles is determined. The desired outcome can be a goal or result of a trip of the group of vehicles. Examples of desired outcomes can include moving a designated amount of cargo from a starting location to a destination location (e.g., moving a number of intermodal containers from Chicago to Los Angeles), moving an unknown or changing amount of cargo to a location within a scheduled time period (e.g., moving passengers between locations on a fixed schedule), or the like.

At step 604, vehicle availability and/or labor availability are determined. The vehicle availability includes a determination of which vehicles are available to be included in the group for the trip. Some vehicles may be unavailable due to the vehicles being too far away to be included in the group for the trip, due to the vehicles being under repair or scheduled for repair, due to the vehicles not being capable of transporting the cargo for the trip, etc. Some vehicles may not be suitable for the desired outcome of the trip. For example, some vehicles may be incapable of transporting the type of cargo needed to be moved, some vehicles may be incapable of traveling at speeds needed to arrive within a scheduled time period, some vehicles may be incapable of traveling to the destination location (e.g., due to (a) the vehicles being too wide or tall and (b) the routes being too narrow or overhead clearances being too low), or the like. The labor availability may include a determination of which personnel are available to operate the vehicles in the group for the trip. Some personnel may be unavailable due to the personnel being too far away to be included in a vehicle of the group for the trip, due to the personnel not being trained or licensed to operate a vehicle in the group, etc.

At step 606, one or more potential groups of vehicles for the trip are determined. A potential group can include a set of one or more vehicles for inclusion in the group for the trip. Optionally, a group can include at least two vehicles. The vehicles selected for inclusion in a potential group can be based on the vehicle availability and/or labor availability determined above.

At step 608, data on externalities are obtained. The data can include information on wind speed and/or direction, friction coefficients, or the like. The data that are obtained can include the wind speed and/or direction at or near (e.g., within a designated distance threshold, such as five kilometers) locations of the trip and/or routes between the locations of the trip.

At step 610, the data are correlated with location(s) of one or more routes of the trip. For example, different potential routes for a trip between a starting location and an end location can be determined. The data associated with locations at or near these routes can be associated with the different locations along the routes.

At step 612, vehicle speeds are determined. These speeds can include actual and/or planned vehicle speeds. For example, the speeds at which a group of vehicles previously traveled on the routes of the trip, the speed limits of the routes of the trip, and/or designated speeds of the vehicles for an upcoming scheduled trip can be determined. The planned speeds can include the speeds at which the vehicles plan to travel along the routes, such as speeds designated by a trip plan of the trip. Optionally, the speeds can be speed limits of the routes. The trip plan can be created to dictate operational settings (e.g., speeds, throttle settings, and/or brake settings) for the vehicles at different locations, different times, and/or different distances along the routes for the trip.

At step 614, an expected trip efficiency for the potential group of vehicles to travel in the trip is determined. The trip efficiency can be determined as an amount of energy drag and/or parasitic energy losses that the potential group of vehicles may experience. As described above, the energy drag and/or parasitic energy losses can be determined based on the vehicle speeds, wind speeds, wind directions, coefficients of friction, etc. Greater energy drags and/or parasitic energy losses indicate lower trip efficiencies, while smaller energy drags and/or parasitic energy losses indicate larger trip efficiencies. In one embodiment, a map or heat map indicating the various energy drags and/or parasitic energy losses that the vehicle system will encounter on different routes during the trip can be determined.

At step 616, a determination is made as to whether the expected trip efficiency is to be determined and/or examined for another, different group of vehicles. For example, a decision can be made as to whether there is another, different group of vehicles that can travel in the trip. If there is another potential group of vehicles to be examined, then flow of the method can proceed toward step 618 for determination of another group of vehicles. But, if there is not another potential group of vehicles to be examined, then flow of the method can proceed toward step 620.

At step 618, another potential group of vehicles may be determined. For example, the number of vehicles in a potential group can be changed from the previously examined potential group, the locations of the vehicles in the previously examined potential group can be changed, and/or the vehicles in the potential group can be changed from the previously examined potential group. Flow of the method can return toward step 612 so that the efficiency of this other, different potential group can be examined. For example, the energy drags and/or parasitic energy losses for this different potential group can be determined. The method can continue in a loop to examine the efficiencies for multiple, different potential groups of vehicles.

Optionally, at step 618, a determination can be made as to whether one or more aspects of the trip can be changed to reduce the energy drag and/or parasitic energy loss for the group of vehicles being examined. The details of the trip can include the speeds at which the vehicle(s) in the group will travel, the routes over which the vehicle(s) in the group will travel, the times at which the vehicle(s) in the group will travel, and the like. One or more of these details can be changed or otherwise adjusted to change the trip and potentially reduce the energy drag and/or parasitic energy loss. For example, traveling at a different time and/or date may result in the vehicle(s) traveling in reduced wind speed and/or traveling in a tailwind as opposed to a headwind.

At step 620, a potential group is selected for traveling in the trip. This selection can be performed by choosing the group of vehicles having the lowest energy drag and/or parasitic energy losses of the examined potential groups (or lower than one or more other potential groups). Responsive to selecting a potential group for the trip, the vehicles in the group can be moved to the same area and the trip can begin.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

For example, the analysis controller and/or vehicle controllers may create or receive a model used to determine energy drags and/or parasitic energy losses at different locations along a route or in a network of routes. This model may include an equation or series of equations that can receive measured energy drags and/or parasitic energy losses as input to the model, and the model can output predicted energy drags and/or parasitic energy losses in other locations. The analysis controller and/or vehicle controller can select vehicles to include in a group and/or decide how to control movement of a vehicle or vehicle group based on this model, as described above. As conditions change, however, this model may no longer be accurate. The analysis controller and/or vehicle controllers can use machine learning or artificial intelligence to iteratively update the model based on new or updated energy drags and/or parasitic energy losses. The model can continue to be updated so that the predicted energy drags and/or parasitic energy losses in various locations (e.g., locations where these drags and/or losses have not been measured, where these drags and/or losses have not been measured cannot be measured, or where these drags and/or losses have been measured but the measurements may be outdated or inaccurate) can continue to be determined or predicted.

In one embodiment, a control system includes one or more processors that may determine wind information for achieving a desired outcome for travel of a selected group of one or more vehicles along one or more routes. The one or more processors also may determine one or more of wind drag or a parasitic energy loss for travel by different potential groups of vehicles based on the wind information. The one or more processors may determine the one or more of wind drag or parasitic energy loss for each of plural, different locations along the one or more routes, visually present the one or more of wind drag or parasitic energy loss for each of the different groups of vehicles, and/or determine the selected group of the one or more vehicles from the different groups of vehicles for travel along the one or more routes to achieve the desired outcome based on the one or more of wind drag or parasitic energy loss that is determined.

The one or more processors may change one or more aspects of the travel of the selected group of the one or more vehicles based on the one or more of wind drag or parasitic energy loss that is determined. The one or more processors may change (e.g., modify) one or more designated speeds at which the one or more vehicles in the selected group are to travel based on the one or more of wind drag or parasitic energy loss that is determined as the one or more aspects of the travel of the selected group. The one or more processors may change at least one route of the one or more routes on which the one or more vehicles in the selected group are to travel based on the one or more of wind drag or parasitic energy loss that is determined as the one or more aspects of the travel of the selected group. The one or more processors may change a time at which the one or more vehicles in the selected group are to travel based on the one or more of wind drag or parasitic energy loss that is determined as the one or more aspects of the travel of the selected group. The one or more processors may change the one or more aspects of the travel of the selected group by changing one or more of a designated speed at which the one or more vehicles in the selected group are to travel, at least one route of the one or more routes on which the one or more vehicles in the selected group are to travel, and/or a time at which the one or more vehicles in the selected group are to travel. The one or more processors may visually present the one or more of wind drag or parasitic energy loss for each of the different groups of vehicles as a heat map that associates different amounts of the one or more of wind drag or parasitic energy loss for the different groups of vehicles with different locations along the one or more routes. The one or more processors may determine wind speed as the wind information. The one or more processors may determine a direction of wind speed as the wind information.

The one or more processors may determine a wind speed and a direction of the wind speed as the wind information. The one or more processors may determine wind speeds for plural different locations along the one or more routes as the wind information. The one or more processors may determine a direction of wind speed for plural different locations along the one or more routes as the wind information. The one or more processors may determine wind speeds and directions of the wind speeds for plural different locations along the one or more routes as the wind information.

The one or more processors may determine vehicle speed and to determine the one or more of wind drag or parasitic energy loss based on both the wind information and the vehicle speed that is determined. The one or more processors may determine a coefficient of drag as a function of apparent wind yaw angle and to determine the one or more of wind drag or parasitic energy loss based on both the wind information and the coefficient of drag that is determined.

The different groups may represent one or more of different numbers of vehicles in the different groups, different vehicles in the different groups, and/or different arrangements of the vehicles in the different groups. The one or more processors may determine the different groups of vehicles based on vehicle availability. The one or more processors may determine the different groups of vehicles based on labor availability of operators to control movement of the vehicles. The one or more processors may generate one or more control signals for controlling the selected group of vehicles, for movement during travel along the one or more routes in a trip, based on the one or more aspects of the upcoming planned travel that are changed (e.g., based on the determined wind drag and/or the determined parasitic energy loss).

In one embodiment, a method may include determining wind information for achieving a desired outcome for travel of a selected group of one or more vehicles along one or more routes, determining one or more of wind drag or a parasitic energy loss for travel by different potential groups of vehicles based on the wind information, and one or more of determining the one or more of wind drag or parasitic energy loss for each of plural, different locations along the one or more routes, visually presenting the one or more of wind drag or parasitic energy loss for each of the different groups of vehicles, and/or determining the selected group of the one or more vehicles from the different groups of vehicles for travel along the one or more routes to achieve the desired outcome based on the one or more of wind drag or parasitic energy loss that is determined.

The method also may include changing one or more aspects of the travel of the selected group of the one or more vehicles based on the one or more of wind drag or parasitic energy loss that is determined. One or more designated speeds at which the one or more vehicles in the selected group are to travel may be changed based on the one or more of wind drag or parasitic energy loss that is determined as the one or more aspects of the travel of the selected group. At least one route of the one or more routes on which the one or more vehicles in the selected group are to travel may be changed based on the one or more of wind drag or parasitic energy loss that is determined as the one or more aspects of the travel of the selected group. A time at which the one or more vehicles in the selected group are to travel may be changed based on the one or more of wind drag or parasitic energy loss that is determined as the one or more aspects of the travel of the selected group.

The one or more aspects of the travel of the selected group may be changed by changing one or more of a designated speed at which the one or more vehicles in the selected group are to travel, at least one route of the one or more routes on which the one or more vehicles in the selected group are to travel, and/or a time at which the one or more vehicles in the selected group are to travel. Visually presenting the one or more of wind drag or parasitic energy loss for each of the different groups of vehicles may include generating a heat map that associates different amounts of the one or more of wind drag or parasitic energy loss for the different groups of vehicles with different locations along the one or more routes. Wind speed may be determined as the wind information. A direction of wind speed may be determined as the wind information. A wind speed and a direction of the wind speed may be determined as the wind information. Wind speeds may be determined for plural different locations along the one or more routes as the wind information. A direction of wind speed may be determined for plural different locations along the one or more routes as the wind information. Wind speeds and directions of the wind speeds may be determined for plural different locations along the one or more routes as the wind information.

The method also may include determining a vehicle speed of the one or more vehicles in the selected group, and may include determining the one or more of wind drag or parasitic energy loss based on both the wind information and the vehicle speed that is determined. The method may include determining a coefficient of drag as a function of apparent wind yaw angle, and determining the one or more of wind drag or parasitic energy loss based on both the wind information and the coefficient of drag that is determined. The different groups may represent one or more of different numbers of vehicles in the different groups, different vehicles in the different groups, and/or different arrangements of the vehicles in the different groups. The different groups of vehicles may be determined based on vehicle availability. The different groups of vehicles may be determined based on labor availability of operators to control movement of the vehicles.

In one embodiment, a control system may include one or more processors configured to determine wind speed and wind direction for plural locations along one or more routes. The one or more processors may determine one or more of wind drag or a parasitic energy loss for travel by different potential groups of one or more vehicles along the one or more routes based on the wind information. The one or more processors may visually present the one or more of wind drag or parasitic energy loss for each of the different groups of one or more vehicles, select a group of the different groups of one or more vehicles for travel along the one or more routes based on the one or more of wind drag or parasitic energy loss that is determined, and/or change one or more aspects of travel of the group of one or more vehicles that is selected.

The one or more aspects of travel that is changed may include a speed at which the one or more vehicles in the group that is selected travel along the one or more routes, a route on which the one or more vehicles in the group that is selected travel along, and/or a time at which the one or more vehicles in the group travel. The one or more processors may visually present the one or more of wind drag or parasitic energy loss for each of the different groups of vehicles as a heat map that associates different amounts of the one or more of wind drag or parasitic energy loss with the locations along the one or more routes. The one or more processors may determine vehicle speed and to determine the one or more of wind drag or parasitic energy loss based on both the wind information and the vehicle speed that is determined.

The one or more processors may determine a coefficient of drag as a function of apparent wind yaw angle and to determine the one or more of wind drag or parasitic energy loss based on both the wind information and the vehicle speed that is determined.

The different groups may represent different numbers of vehicles in the different groups, different vehicles in the different groups, and/or different arrangements of the vehicles in the different groups. The one or more processors may determine the different groups of vehicles based on vehicle availability. The one or more processors may determine the different groups of vehicles based on labor availability of operators to control movement of the vehicles.

In one embodiment, a method may include receiving or otherwise determining wind information for an upcoming trip along one or more routes with one or more processors, determining one or more of respective wind drags or respective parasitic energy losses for travel by different groups of vehicles in the upcoming trip based on the wind information with the one or more processors (where each of the groups of vehicles has at least two respective vehicles), and one or more of visually presenting the one or more of wind drags or parasitic energy losses for the different groups of vehicles, or automatically selecting a group of the different groups of vehicles for travel along the one or more routes in the trip based on the one or more of wind drags or parasitic energy losses that are determined with the one or more processors.

The method also may include receiving a user-selected group of the different groups of vehicles for travel along the one or more routes in the trip with the one or more processors responsive to the one or more of wind drags or parasitic energy losses for the different groups of vehicles that are visually presented and automatically generating one or more control signals for controlling the vehicles of the user-selected group for travel along the one or more routes in the trip with the one or more processors. The method also may include automatically generating one or more control signals with the one or more processors for controlling the vehicles of the group of the different groups of vehicles that was automatically selected, for travel along the one or more routes in the trip.

In one embodiment, a system is provided that includes one or more processors that may determine one or more of an energy drag or a parasitic energy loss for upcoming planned travel of a vehicle along one or more routes based on externality information. The one or more processors may determine the one or more of the energy drag or the parasitic energy loss for each of plural, different route locations along the one or more routes and may change one or more aspects of the upcoming planned travel of the vehicle based on the one or more of energy drag or parasitic energy loss that is determined.

The one or more processors may use an artificial intelligence or machine learning model of the one or more of the energy drag or the parasitic energy loss to determine the one or more of the energy drag or the parasitic energy loss for at least one of the plural, different route locations along the one or more routes. The system also may include one or more onboard sensors that may measure vehicle locations associated with the externality information. The one or more processors may change movement of the vehicle as the one or more aspects of the upcoming planned travel of the vehicle.

The one or more processors may determine one or more designated speeds at which the vehicle is to move as the one or more aspects of the upcoming planned travel. The one or more processors may change at least one route of the one or more routes on which the vehicle is scheduled to travel along based on the one or more of the energy drag or the parasitic energy loss that is determined. The one or more processors may change a time at which the vehicle is to travel based on the one or more of the energy drag or the parasitic energy loss that is determined. The one or more processors may determine one or more of a wind speed or a wind direction as the one or more of the energy drag or the parasitic energy loss.

In another example, a method is provided that may include determining one or more of an energy drag or a parasitic energy loss for upcoming planned travel of a vehicle along one or more routes based on externality information, determining the one or more of the energy drag or the parasitic energy loss for each of plural, different route locations along the one or more routes, and changing one or more aspects of the upcoming planned travel of the vehicle based on the one or more of energy drag or parasitic energy loss that is determined.

Determining the one or more of the energy drag or the parasitic energy loss for at least one of the plural, different route locations along the one or more routes may be performed using an artificial intelligence or machine learning model of the one or more of the energy drag or the parasitic energy loss. The method also may include measuring vehicle locations associated with the externality information. Changing the one or more aspects of the upcoming planned travel of the vehicle may include changing movement of the vehicle. Changing the one or more aspects of the upcoming planned travel may include determining one or more designated speeds at which the vehicle is to move as.

Changing the one or more aspects of the upcoming planned travel may include changing at least one route of the one or more routes on which the vehicle is scheduled to travel along based on the one or more of the energy drag or the parasitic energy loss. Changing the one or more aspects of the upcoming planned travel may include changing a time at which the vehicle is to travel based on the one or more of the energy drag or the parasitic energy loss that is determined. The one or more of the energy drag or the parasitic energy loss may include one or more of a wind speed or a wind direction.

Another system may include one or more processors that may determine wind speed and wind direction for plural locations along one or more routes using an artificial intelligence or machine learning model, the one or more processors also configured to determine one or more of wind drag or a parasitic energy loss for travel by a vehicle along the one or more routes based on the wind speed and wind direction. The one or more processors may determine settings of the vehicle for travel along the one or more routes based on the one or more of wind drag or parasitic energy loss that is determined using the artificial intelligence or machine learning model.

The one or more processors may determine the settings of the vehicle by changing one or more of a planned speed at which the vehicle is planned to travel along the one or more routes, a planned route on which the vehicle is planned to travel along, or a planned time at which the vehicle is to travel. The one or more processors may determine a coefficient of drag as a function of apparent wind yaw angle and to determine the one or more of wind drag or parasitic energy loss based on the wind speed, the wind direction, and the coefficient of drag that is determined. The one or more processors may determine which of different groups of additional vehicles that the vehicle is to travel with based on the one or more of wind drag or parasitic energy loss that is determined.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A system comprising:
one or more processors configured to determine one or more of an energy drag or a parasitic energy loss for upcoming planned travel of a vehicle along one or more routes based on externality information,
the one or more processors are configured to determine the one or more of the energy drag or the parasitic energy loss for each of plural, different route locations along the one or more routes and to change movement of the vehicle based on the one or more of energy drag or parasitic energy loss that is determined.

2. The system of claim 1, wherein the one or more processors are configured to use an artificial intelligence or machine learning model of the one or more of the energy drag or the parasitic energy loss to determine the one or more of the energy drag or the parasitic energy loss for at least one of the plural, different route locations along the one or more routes.

3. The system of claim 1, further comprising: one or more onboard sensors configured to measure vehicle locations associated with the externality information.

4. The system of claim 1, wherein the one or more processors are configured to determine one or more designated speeds at which the vehicle is to move based on the one or more of energy drag or parasitic energy loss that is determined.

5. The system of claim 1, wherein the one or more processors are configured to change at least one route of the one or more routes on which the vehicle is scheduled to travel along based on the one or more of the energy drag or the parasitic energy loss that is determined.

6. The system of claim 1, wherein the one or more processors are configured to change a time at which the vehicle is to travel based on the one or more of the energy drag or the parasitic energy loss that is determined.

7. The system of claim 1, wherein the one or more processors are configured to determine one or more of a wind speed or a wind direction as the one or more of the energy drag or the parasitic energy loss.

8. A method comprising:
  determining one or more of an energy drag or a parasitic energy loss for upcoming planned travel of a vehicle along one or more routes based on externality information;
  determining the one or more of the energy drag or the parasitic energy loss for each of plural, different route locations along the one or more routes; and
  changing movement of the vehicle based on the one or more of energy drag or parasitic energy loss that is determined.

9. The method of claim 8, wherein determining the one or more of the energy drag or the parasitic energy loss for at least one of the plural, different route locations along the one or more routes is performed using an artificial intelligence or machine learning model of the one or more of the energy drag or the parasitic energy loss.

10. The method of claim 8, further comprising: measuring vehicle locations associated with the externality information.

11. The method of claim 8, comprising determining one or more designated speeds at which the vehicle is to move as based on the one or more of energy drag or parasitic energy loss that is determined.

12. The method of claim 8, comprising changing at least one route of the one or more routes on which the vehicle is scheduled to travel along based on the one or more of the energy drag or the parasitic energy loss.

13. The method of claim 8, comprising changing a time at which the vehicle is to travel based on the one or more of the energy drag or the parasitic energy loss that is determined.

14. The method of claim 8, wherein the one or more of the energy drag or the parasitic energy loss includes one or more of a wind speed or a wind direction.

15. A system comprising:
  one or more processors configured to determine wind speed and wind direction for plural locations along one or more routes using an artificial intelligence or machine learning model, the one or more processors also configured to determine one or more of wind drag or a parasitic energy loss for travel by a vehicle along the one or more routes based on the wind speed and wind direction,
  wherein the one or more processors are configured to change movement of the vehicle for travel along the one or more routes based on the one or more of wind drag or parasitic energy loss that is determined using the artificial intelligence or machine learning model.

16. The system of claim 15, wherein the one or more processors are configured to change one or more of a planned speed at which the vehicle is planned to travel along the one or more routes, a planned route on which the vehicle is planned to travel along, or a planned time at which the vehicle is to travel.

17. The system of claim 15, wherein the one or more processors are configured to determine a coefficient of drag as a function of apparent wind yaw angle and to determine the one or more of wind drag or parasitic energy loss based on the wind speed, the wind direction, and the coefficient of drag that is determined.

18. The system of claim 15, wherein the one or more processors are configured to determine which of different groups of additional vehicles that the vehicle is to travel with based on the one or more of wind drag or parasitic energy loss that is determined.

* * * * *